US008164447B2

(12) United States Patent
Wittke

(10) Patent No.: US 8,164,447 B2
(45) Date of Patent: Apr. 24, 2012

(54) CLOSING SYSTEM HAVING A FORCE SENSOR

(75) Inventor: Norman Wittke, Albstadt (DE)

(73) Assignee: ASSA ABLOY Sicherheitstechnik GmbH, Albstadt (DE)

(*) Notice: Subject to any disclaimer, the term of this patent is extended or adjusted under 35 U.S.C. 154(b) by 401 days.

(21) Appl. No.: 12/524,615

(22) PCT Filed: Jan. 21, 2008

(86) PCT No.: PCT/EP2008/000428
§ 371 (c)(1), (2), (4) Date: Oct. 5, 2009

(87) PCT Pub. No.: WO2008/089941
PCT Pub. Date: Jul. 31, 2008

(65) Prior Publication Data

US 2010/0102978 A1 Apr. 29, 2010

(30) Foreign Application Priority Data

Jan. 26, 2007 (DE) ......................... 10 2007 004 073

(51) Int. Cl.
*G08B 13/08* (2006.01)
*B60J 5/00* (2006.01)

(52) U.S. Cl. ................ 340/545.1; 340/545.2; 296/146.4

(58) Field of Classification Search ............... 340/545.1, 340/545.2, 545.3, 545.4, 665; 296/146.12, 296/146.4, 146.8; 160/188, 206; 73/114.01
See application file for complete search history.

(56) References Cited

U.S. PATENT DOCUMENTS

| | | | | |
|---|---|---|---|---|
| 6,637,494 | B1 * | 10/2003 | Nabeta | 160/206 |
| 6,955,079 | B2 * | 10/2005 | Ishihara et al. | 73/114.01 |
| 7,055,885 | B2 * | 6/2006 | Ishihara et al. | 296/146.4 |
| 7,438,346 | B1 * | 10/2008 | Breed | 296/146.4 |
| 2009/0153317 | A1 * | 6/2009 | Kim | 340/447 |

FOREIGN PATENT DOCUMENTS

| | | | |
|---|---|---|---|
| DE | 4138078 | A1 | 5/1992 |
| DE | 19808686 | C2 | 10/2000 |
| DE | 20311878 | U1 | 10/2003 |
| FR | 2368863 | A | 5/1978 |
| GB | 2024917 | A | 1/1980 |
| GB | 2272245 | A | 5/1994 |

* cited by examiner

*Primary Examiner* — Van T. Trieu
(74) *Attorney, Agent, or Firm* — Baker & Hostetler LLP

(57) ABSTRACT

The invention relates to a closing system comprising at least one door provided with at least one displaceable closure element and a closure element receiving member. The at least one closing element of the door lock projects into the closing element receiving member when the closing system is in the closed state. The invention also relates to a keyless entry system for controlling the access of a chamber door, and to a method for controlling the closing state of the closing system comprising at least one door provided with a displaceable closing element and a closing element receiving member, whereby the at least one closing element of the door lock projects into closing element receiving member when the closing system is in the closed state, a force sensor and an evaluation unit. The closing system can be switched, in the closed state, from a first operational state to a second operational state.

17 Claims, No Drawings

CLOSING SYSTEM HAVING A FORCE SENSOR

CROSS-REFERENCE TO RELATED APPLICATIONS

This application is a National Stage of International patent application PCT/EP2008/000428, filed on Jan. 21, 2008, which claims priority to foreign patent application DE 10 2007 004 073.5, filed on Jan. 26, 2007, the disclosures of which are incorporated herein by reference in their entirety.

FIELD OF THE INVENTION

The present invention relates to a closing system for a door. More particularly, the present invention relates to a closing system for a door that includes a force sensor.

BACKGROUND OF THE INVENTION

Fundamentally, especially in the field of high-quality door locks, there is an increased demand for equipping them with particularly high opening comfort. This relates in particular to the relief of the user during the authorization verification and in the context of door opening. Thus, for example, required key and latch actuations for triggering the unlocking of the closing system are frequently perceived to be annoying. In this context, integrating a sensor in the closing system, which may detect the beginning and end of an opening procedure and supplies a locking element with electrical power after completed detection, is known from DE 198 08 686 C2. In order to make it easier to integrate motorized locks into door locking systems in particular, situating a transmitter coupled to the door latch movement in the door leaf, in order to trigger an unlocking of the motorized lock situated on the door frame side using a radio signal in case of a door latch movement, is also known from DE 203 11 878 U1.

Simultaneously, however, an increased resistance capability of the closing system to break-in attempts and, if possible, additionally the detection of such break-in attempts is desirable. In this context, for example, DE 41 38 078 A1 discloses an electromagnetic locking system having a pivotable electromagnet housing, a switch being actuated by pivoting of this housing which triggers an acoustic alarm. This comparatively complexly constructed locking system of DE 41 38 078 A1 only allows opening detection in the opening direction, however. The equivalent integration of these two preceding user requirements, which are contradictory to one another (increased operating and/or opening comfort and simultaneously increased resistance force), in a closing system is difficult in that a closing system which is more resistant to break-in attempts typically places an increased effort for unlocking and/or locking on the user. In addition, a reliable differentiation between an authorized entry attempt and a break-in and/or manipulation attempt, in which an alarm is to be triggered, for example, is particularly problematic in closing systems of this type. The attempt to remedy this circumstance by increased detection sensitivity of the closing systems with respect to break-in attempts regularly results in the triggering of false alarms, however, which is perceived as annoying by the users of such closing systems.

SUMMARY OF THE INVENTION

The invention is therefore based on the object of disclosing a closing system which has high opening comfort, is simply constructed, and which may differentiate especially well between an authorized entry attempt and a break-in attempt to trigger an alarm state.

Embodiments of the present invention provide a closing system that includes at least one door and in particular a door leaf having at least one movable closure element, a closure element receptacle, the at least one closure element projecting into the closure element receptacle in the closed state of the closing system, and a force sensor, which generates a measured signal in relation to the force acting on the door and relays the signal to an analysis unit, the analysis unit switching the closing system in the closed state as a function of a measured signal limiting value from a first operating state into a second operating state, for example, from a "locked" state into an "unlocked" state. Embodiments of the present invention also provide a keyless entry system for access control of a room door. Further embodiments of the present invention provide a method for controlling the closing state of a closing system that includes a door and in particular a door leaf having at least one movable closure element, such as a movable bolt of a door lock, and a closure element receptacle, the at least one closure element projecting into the closure element receptacle in the closed state of the closing system.

DETAILED DESCRIPTION

According to the invention, the locking system comprises a force sensor, which generates a measured signal in relation to the force acting on the door and in particular on a door leaf of the door and relays the signal to an analysis unit, the analysis unit switching the closing system in the closed state as a function of a measured signal limiting value from a first operating state into a second operating state and in particular from a "locked" state into an "unlocked" state. The closure element in the meaning of the invention particularly comprises formfitting locking elements of any type, such as magnetic clamps, solenoids, motorized bolts, shear locks, pivot hooks, and very particularly also bolts of door locks. The following remarks in connection with the bolt of a door lock may thus also be transferred according to the invention to these further locking elements. Upon actuation of the door, the operator exerts tension or pressure forces on the door, for example, on the door leaf of the door. The force acting on the door and in particular on the door leaf is measured and evaluated using the force sensor, the operating state of the closing system and in particular the locking state being controlled directly on the basis of the analysis result. Therefore, a change of the operating state of the closing system may be caused via a change of the force or forces acting on the door and in particular on the door leaf and/or the analysis unit decides on the basis of the signal generated by the force sensor whether or not a changeover occurs from the first operating state into the second operating state. Forces acting on the door and in particular on the door leaf in the meaning of the invention comprise in particular those loads which act on the door and in particular on the door leaf in or opposite to the opening direction of the door. The level of the measured signal limiting value receives central significance, because the minimum force which must be applied in a way detectable by the force sensor in order to trigger a changeover of the closing system from the first operating state into the second operating state is settable in this way. Thus, for example, it is possible to select the level of the measured signal limiting value in such a way that wind strains acting on the door leaf do not yet result in a changeover. In this embodiment, a signal value limit is thus provided, a changeover first being triggered when the measured signal exceeds it.

The first and second operating states are to be understood hereafter in particular as the "locked" state and the "unlocked" state of the closing system, the closing system not being passable and/or being locked in the "locked" state and passage of the door being possible and/or the door being able to be opened in the "unlocked" state of the closing system. According to the invention, as a result, the operating state of the closing system is influenced and/or controlled using the force acting on the door and in particular on the door leaf. The provided analysis unit receives a measured signal generated by the force sensor and/or force pickup for this purpose, which is related to the force acting on the door and in particular on the door leaf. On the basis of the measured signal intensity, the analysis unit decides in the closed state of the closing system whether a changeover of the closing system from the current, for example, first operating state into the second operating state is to occur. In order to ensure an adaptation to individual requirements especially well, the analysis unit is typically implemented as programmable, especially the measured signal limiting value, which causes the closing system to change over from the first operating state into the second operating state when the measured signal exceeds it, being able to be adapted to personal requirements, but also to the door and in particular the door leaf properties, such as the physical location of the closing system in building access areas or between two rooms. According to the invention, for example, a passage demand may be signaled by pressing the door and in particular the door leaf in the opening direction of the door. If the load acting on the door and in particular on the door leaf, which is measured by the force sensor, exceeds the measured signal limiting value, the closing system is switched, for example, from a "locked" state into an "unlocked" or "open" state and may be opened merely by the party desiring entry pressing on it in the case of the "open" state. The remarks made hereafter in regard to a door leaf may also be transferred according to the invention to a door per se, for example, from the automotive field.

According to the invention, all force sensors typically suitable for force measurement are suitable for measuring and/or determining the force acting on the door and in particular on the door leaf. These include, for example, strain gauges, spring body pressure force pickups, and in particular also piezoelectric force sensors. According to the invention, in particular the spatial extension of the force sensor is decisive for the selection of a suitable force sensor. Thus, for example, those force sensors which require relatively little space in their spatial extension are especially well suitable for integration in a closing system according to the invention. This very particularly relates to piezoelectric force sensors. The fastening of the force sensors is performed in a typical way, for example, by gluing, screwing on, etc. The force sensor is also positioned at a point in the closing system at which the forces and/or force changes loading the door and in particular the door leaf are detectable in regard to force. Detection in regard to force means in particular that forces/loads and/or force changes/load changes loading the door and very particularly the door leaf are detected by a force measurement occurring via the force sensor.

The object is achieved according to the invention in that the closing system has at least one impingement means, which impinges the force sensor with a preload in the closed state of the closing system, for detecting alternating loads acting on the door and in particular on the door leaf. Loads in the meaning of the invention comprise in particular forces acting on specific components. Alternating loads acting on the door and in particular on the door leaf are thus to be understood as forces which act in sequence oriented in different spatial directions on the door and in particular on the door leaf. This relates in particular to loads which act in the opening direction and opposite to the opening direction, i.e., in opposing directions in the closed state of the closing system on the door and in particular on the door leaf. A preload in the meaning of the invention is understood as a force which is applied as a standard force to the force sensor by an impingement means implemented in a suitable way. An impingement of the force sensor with a preload thus has the effect that for the case in which neither an alternating load nor any other external load and/or force acts on the door leaf in the opening direction or in the closing direction, for example, the force sensor measures the preload applied by the impingement means. The force sensor is thus normally impinged in the idle state of the closed door using a force and/or preload. This embodiment correspondingly allows, for example, the determination of negative and positive forces, which act in the opening direction of the door on the door and in particular on the door leaf in the closed state of the closing system. This is, inter alia, typically the case upon shaking of the door. In the closed normal state of the closing system, the impingement means thus exerts a continuous force on the force sensor. For the preload strain of the force sensor, in particular a spring impingement or an elastomeric impingement, for example, via a door seal, of corresponding pressure pieces which are pressed against the force sensor and/or act thereon in the closed state of the door, have proven to be suitable.

Preferably, at least one adjustment unit is provided, by which the preload exerted by the at least one impingement means on the force sensor is adjustable. The adjustment unit thus allows the preload exerted on the force sensor to be varied, whereby an outstanding adaptation of the closing system to individual environmental conditions may be achieved. Thus, for example, significant differences sometimes exist in the loads acting on the door and in particular on the door leaf between closing systems, which are situated, on the one hand, inside buildings and, on the other hand, in building access areas or even in exposed and particularly windy locations. Such an adjustment unit may be implemented, for example, via a screw connection, via which the spring tension of a spring acting on the pressure piece may be varied.

It has been shown that a closing system having an analysis unit which switches the closing system in the closed state, as a function of the measured signal falling below a lower measured signal limiting value or exceeding an upper measured signal limiting value, from the first into the second operating state, particularly reliably controls a changeover from the first into the second operating state. In this preferred embodiment, a measured signal range correspondingly exists, within which the analysis unit does not change the operating state of the closing system according to the invention and/or within which, for example, no changeover is thus triggered from a "locked" state into an "unlocked" state by the analysis unit. This measured signal range is delimited by a lower measured signal limiting value and an upper measured signal limiting value. As soon as the analysis unit ascertains that the measured signal generated by the force sensor has left the measured signal range and thus lies outside the measured signal range bounded by the upper and lower measured signal limiting values and/or lies above the upper measured signal limiting value or below the lower measured signal limiting value, the closing system switches from the first into the second operating state. This special embodiment thus deals with alternating loads detected by the force sensor particularly well, because both if the measured signal falls below the measured signal range, for example, through a negative load or, for example, pressing on the locked door opposite to the opening direction, and also if the measured signal exceeds the measured signal range, for example, through a positive load or pulling on the locked door in the opening direction, the closing system is switched by the analysis unit from the first into the second operating state.

In a particularly preferred embodiment of the closing system according to the invention, an alarm limiting value is provided, which causes the analysis unit to switch the closing system into an alarm state if the measured signal exceeds it. In this embodiment, the analysis unit thus additionally decides on the basis of the signal generated by the force sensor whether or not a changeover of the closing system into an alarm state occurs. An alarm state in the meaning of the invention is distinguished by measures which signal and/or counteract a break-in/manipulation attempt on the closing system according to the invention. This may relate, for example, to the triggering of acoustic signals in the immediate surroundings of the door or also a so-called silent alarm, which displays an alarm state of the closing system in a burglar alarm central office. Alternatively or additionally, measures may be triggered in the alarm state which counteract unauthorized opening of the door. For example, these may be further locking processes which result in more solid locking of the door and thus counteract violent opening of the closing system. In order that the closing system does not switch routinely into the alarm state, the alarm limiting value is typically above the measured signal limiting value. To change the closing system over into the alarm state, the measured signal intensity thus first exceeds the measured signal limiting value, the closing system being changed over from the first into the second operating state after the limiting value is exceeded. Only when the loads detected by the force sensor are finally additionally also above the alarm limiting value in their measured signal intensity is the closing system finally switched into the alarm state.

Alternatively to an alarm limiting value, in a further preferred embodiment, a measured signal range is also provided, also referred to hereafter as the alarm measured signal range, which causes the analysis unit to switch the closing system into the alarm state if the measured signal falls below or exceeds it. It is advantageous in this embodiment that the alarm state may thus be triggered both by forces which act in the opening direction of the door and also by forces which act on the door opposite to the opening direction of the door, and/or both by positive loads and also by negative loads. Furthermore, the measured signal range typically lies within the alarm measured signal range, which causes the analysis unit to switch the closing system from the first into the second operating state when the measured signal leaves it. In this way, the analysis unit switches the closing system, firstly from the first into the second operating state, both in the event of positive loads and also in the event of negative loads upon leaving this measured signal range. If the positive or negative load acting on the door leaf increases further, the control unit finally switches the closing system into the alarm state for the case that the measured signal intensity also leaves the alarm measured signal range. The sensitivity of the closing system for triggering the alarm state may be set by the width of the measured signal interval and may be adapted to individual specifications.

In a preferred embodiment, the force sensor is situated on the door frame. An installation of the force sensor on the door frame is advantageous in that no additional wiring of the door leaf is necessary. Retrofitting by this special closing system is thus particularly simple and cost-effective. The positioning of the force sensor situated on the door frame is possible in all areas of the door frame, against which a door leaf area strikes in the closed state of the door and/or the force sensor may detect loads loading the door leaf.

An integration of the force sensor in the door lock and in particular on a lock bolt and/or on a lock latch is alternatively also preferable. This embodiment has the advantage that manipulation attempts on the door lock may be detected particularly well. For this purpose, it is possible to situate the force sensor on the at least one movable closure element, such as a lock bolt or a lock latch, in such a manner that a force impingement of the force sensor may be exerted in the closed state of the door from a subarea of the closure element receptacle. Furthermore, it is also possible to situate both one force sensor on the lock bolt and also a further force sensor on the lock latch. This combined configuration of two force sensors allows a particularly reliable detection of manipulation attempts on the door lock.

It is also preferable to situate the force sensor on a door hinge. The door hinge has the object of allowing the smoothest possible pivoting of the door and connects the door frame to the door leaf. The advantage also results in this embodiment that complex wiring of the door leaf may typically be dispensed with. In addition, door hinges are typically compact components which are difficult to access, so that manipulation attempts on the force sensor are made significantly more difficult.

A further preferred configuration of the force sensor occurs on the striker plate. A striker plate is typically a flat steel plate having at least one opening and/or recess, into which the movable closure element, such as a lock bolt or a lock latch, may engage in the at least one frame-side closure element receptacle in the closed state of the closing system. An integration of the force sensor in the striker plate is particularly advantageous in that the striker plate of a closing system may be replaced relatively easily. In this way, a striker plate having a force sensor and in particular an integrated force sensor is particularly well suitable for retrofitting an existing closing system using a force-sensor-controlled closing system according to the invention.

Furthermore, it is possible in a further preferred embodiment to situate the force sensor for force detection in the locked state of the door on a magnetic clamp. Magnetic clamps in the field of closing systems are typically used for additional locking of doors. For this purpose, the magnetic clamps have a magnetic element based on an electromagnet, for example, which is typically fastened on the door frame. A clamp counter plate or a comparable apparatus is provided on the door leaf, which strikes against the magnetic clamp in the closed state of the door. If an electromagnet is used, in this way, for example, by turning on the magnetic clamp, an attraction the clamp counter plate fastened on the door leaf may be caused, whereby a door secured in such a manner is additionally locked and/or held in the closed position. It is preferable according to the invention to situate the force sensor between the contact surfaces of the magnet and the clamp counter plate facing toward one another. Through the attractive force of the magnetic clamp exerted on the clamp counter plate, it is thus possible in a particularly elegant way to impinge the force sensor with a defined preload, without additional means being necessary for this purpose. This embodiment is thus distinguished by particularly high functionality and a simple construction.

Furthermore, it is preferable to situate the force sensor on the door leaf The configuration of the force sensor on the door leaf is preferably performed in such a way that the force sensor is situated in a subarea of the door leaf which strikes against the door frame in the closed state of the door. This embodiment is particularly suitable for the retrofitting field because of the simple installation.

Finally, it is also preferable for the closing system to have a door opener, the force sensor being integrated in the door opener. This embodiment is advantageous because in this case typically additional wiring may be dispensed with, because corresponding connection means for the analysis unit and the force sensor are typically already provided in a door opener. Furthermore, a particularly compact construction of the closing system according to the invention may be implemented using this special embodiment. The force sensor is situated inside the door opener in such a way that a closure element, which projects into the door opener in the closed state of the door, acts on the force sensor in or opposite to the opening direction of the door.

The combination of multiple force sensors in one closing system according to the invention is also possible according to the invention. In this way, an increased functional reliability of the closing system may be achieved in the specific case. The force sensors may also particularly be situated in different areas and/or at different points of the closing systems for the detection in regard to force of loads and in particular alternating loads.

The object of the invention is also achieved by a keyless entry system for access control of a room door, which has a closing system according to the invention according to the above statements. The fundamental mode of operation of a so-called keyless entry system is based on the concept that keyless passage of a door having a locking system based on a user inquiry triggered by the closing system is made possible. The keyless entry system according to the invention thus comprises a transceiver unit, which emits an inquiry signal and is implemented to receive an identification signal. For the access authorization verification, the party desiring entry typically carries a transponder, which decodes the inquiry signal after receiving it and emits an identification signal in case of positive identification. This identification signal is received by the transceiver unit and analyzed by a control unit, which may be integrated in the analysis unit, for example. In case of positive access authorization verification, the room door is unlocked and may be opened by the party desiring access. A room door in the meaning of the invention relates to doors which are implemented for access to building rooms, such as office rooms, residential rooms, entry areas, etc.

Keyless unlocking of the closing system is thus characteristic of keyless entry systems. To trigger the emission of the inquiry signal by the transceiver unit, it is provided according to the invention that the inquiry signal controller is coupled via a force sensor, which generates a measured signal related to the force acting on the door and in particular on the door leaf and relays it to an analysis unit, the analysis unit switching the closing system of the keyless entry system in the closed state, as a function of a measured signal limiting value, from a "locked" operating state into an "unlocked" operating state. According to the invention, pressure of the party desiring entry on the door and in particular on the door leaf thus allows the inquiry signal emission to be activated and thus the identification process up to unlocking of the door to be initiated. This embodiment is distinguished by particularly high functional reliability, because, on the one hand, the force sensor may be situated concealed in the closing system, so that manipulation attempts are made significantly more difficult. On the other hand, the party desiring access is freed of an unlocking procedure using a key. The keyless entry system according to the invention is thus also particularly user-friendly.

The object of the invention is also achieved by a method for controlling the closing state of a closing system, the closing system having at least one door and in particular a door leaf having at least one movable closure element, such as a bolt of a door lock in particular, a closure element receptacle, the at least one closure element, which is preferably on the door lock side, projecting into the closure element receptacle in the closed state of the closing system, a force sensor, and an analysis unit, the closing system being switchable in the closed state into a first and a second operating state, which comprises the following method steps:

generating a force-dependent measured signal by the force sensor;

relaying the measured signal to the analysis unit;

comparing the measured signal to at least one measured signal limiting value or a measured signal limiting value range; and changing over the closing system from the first operating state into the second operating state if the measured signal limiting value is exceeded and/or if a measured signal outside the measured signal limiting value range exists.

In the method according to the invention, the linkage of the emission of the inquiry signal by the transceiver unit to the generation of a force-dependent measured signal by a force sensor is thus provided. Such a method has outstanding functional reliability, because the manual expression of will of the party desiring access is spatially separated from the generation of the signal which finally triggers the emission of the inquiry signal. This spatial separation also represents an additional feature of the method according to the invention, because incorrect triggers of the emission of the inquiry signal and/or manipulation effects may be significantly reduced in their extent. The method according to the invention is further distinguished in that the force-dependent measured signal is relayed to the analysis unit. The force-dependent measured signal is directly related to the force acting on the door leaf. Reference is made to the preceding statements in regard to the implementation of the operating states and/or the measured signal limiting value/range.

To achieve the object, in the method according to the invention, a changeover of the closing system into an alarm state is triggered by the analysis unit after the identification of a characteristic measured signal pattern and/or if the measured signal exceeds an alarm threshold value. Measured signal patterns arise through typical movement sequences, such as shaking on a locked door. Such a method detects unauthorized entry attempts particularly reliably.

What is claimed is:

1. A closing system, comprising:

an analysis unit, at least one door having at least one movable closure element, a closure element receptacle, the closure element projecting into the closure element receptacle in a closed state of the closing system, a force sensor to generate a measured signal in relation to the force acting on the door, and to relay the measured signal to the analysis unit, and at least one impingement means to detect alternating loads acting on the door, wherein the analysis unit switches the closing system in the closed state, as a function of a measured signal limiting value, from a first operating state into a second operating state, and wherein the impingement means loads the force sensor with a preload in the closed state.

2. The closing system according to claim 1, further comprising at least one adjustment unit to adjust the preload exerted by the impingement means on the force sensor.

3. The closing system according to claim 1, wherein the analysis unit switches the closing system from the first operating state into the second operating state, in the closed state, as a function of the measured signal falling below a lowered measured signal limiting value or exceeding an upper measured signal limiting value.

4. The closing system according to claim 1, wherein an alarm limiting value causes the analysis unit to switch the closing system into an alarm state if the measured signal exceeds the alarm limiting value.

5. The closing system according to claim 1, wherein a measured signal range causes the analysis unit to switch the closing system into the alarm state if the measured signal exceeds or falls below the measured signal range.

6. The closing system according to claim 1, wherein the force sensor is situated on the door frame.

7. The closing system according to claim 1, wherein the force sensor is integrated in a door lock and in particular is situated on a lock bolt and/or on a lock latch.

8. The closing system according to claim 1, wherein the force sensor is situated on a door hinge.

9. The closing system according to claim 1, wherein the force sensor is situated on a striker plate.

10. The closing system according to claim 1, wherein the force sensor is situated on a magnetic clamp.

11. The closing system according to claim 1, wherein the force sensor is situated on a door leaf.

12. The closing system according to claim 1, further comprising a door opener, wherein the force sensor is integrated in the door opener.

13. The closing system according to claim 1, further comprising multiple force sensors whose measured signals are combined with one another.

14. A keyless entry system for access control of a room door including a closing system according to claim 1.

15. The closing system according to claim 1, wherein the first operating state is a locked state, and the second operating state is an unlocked state.

16. A method for controlling the closing state of a closing system, the closing system comprising at least one door having at least one movable closure element and a closure element receptacle, the closure element projecting into the closure element receptacle in a closed state, a force sensor, and an analysis unit, the closing system being switchable in the closed state into a first operating state and a second operating state, the method comprising:

a) generating a force-dependent measured signal by the force sensor;

b) relaying the measured signal to the analysis unit;

c) comparing the measured signal to at least one measured signal limiting value or measured signal limiting value range; and d) changing over the closing system from the first operating state into the second operating state if the measured signal exceeds the measured signal limiting value and/or if a measured signal outside the measured signal limiting value range exists, wherein the analysis unit triggers a changeover of the closing system into an alarm state after the identification of a characteristic measured signal pattern and/or if an alarm threshold value is exceeded by the measured signal.

17. The method according to claim 16, wherein the first operating state is a locked state, and the second operating state is an unlocked state.

* * * * *